US007853363B1

(12) United States Patent
Porter et al.

(10) Patent No.: US 7,853,363 B1
(45) Date of Patent: Dec. 14, 2010

(54) EVAPOTRANSPIRATION UNIT CONNECTABLE TO AN IRRIGATION CONTROLLER

(75) Inventors: Lamonte D. Porter, San Marcos, CA (US); Peter J. Woytowitz, San Diego, CA (US); Christopher M. Shearin, Murrieta, CA (US)

(73) Assignee: Hunter Industries, Inc., San Marcos, CA (US)

( * ) Notice: Subject to any disclaimer, the term of this patent is extended or adjusted under 35 U.S.C. 154(b) by 1165 days.

(21) Appl. No.: 10/985,425

(22) Filed: Nov. 9, 2004

(51) Int. Cl.
*G05D 11/00* (2006.01)
*A01G 27/00* (2006.01)

(52) U.S. Cl. .............................. 700/284; 239/63; 239/69

(58) Field of Classification Search ................. 700/284; 239/68–70, 723, 63; 405/36, 37; 137/78.2, 137/78.3
See application file for complete search history.

(56) References Cited

U.S. PATENT DOCUMENTS

| | | | | |
|---|---|---|---|---|
| 5,696,671 | A * | 12/1997 | Oliver | 700/284 |
| 5,870,302 | A * | 2/1999 | Oliver | 700/284 |
| 6,088,621 | A | 7/2000 | Woytowitz et al. | 700/16 |
| 6,298,285 | B1 | 10/2001 | Addink et al. | 700/284 |
| 6,314,340 | B1 * | 11/2001 | Mecham et al. | 700/284 |
| 6,452,499 | B1 * | 9/2002 | Runge et al. | 239/63 |
| 6,782,311 | B2 * | 8/2004 | Barlow et al. | 700/284 |
| 6,823,239 | B2 * | 11/2004 | Sieminski | 700/284 |
| 6,892,114 | B1 * | 5/2005 | Addink et al. | 700/284 |
| 6,895,987 | B2 * | 5/2005 | Addink et al. | 700/284 |
| 7,058,478 | B2 * | 6/2006 | Alexanian | 700/284 |
| 7,403,840 | B2 * | 7/2008 | Moore et al. | 700/284 |
| 7,596,429 | B2 * | 9/2009 | Cardinal et al. | 700/284 |
| 2003/0093159 | A1 * | 5/2003 | Sieminski | 700/12 |
| 2003/0109964 | A1 | 6/2003 | Addink et al. | 700/284 |
| 2003/0179102 | A1 * | 9/2003 | Barnes | 340/870.07 |
| 2004/0011880 | A1 * | 1/2004 | Addink et al. | 239/1 |
| 2004/0030456 | A1 * | 2/2004 | Barlow et al. | 700/284 |
| 2004/0039489 | A1 * | 2/2004 | Moore et al. | 700/284 |

(Continued)

OTHER PUBLICATIONS

East Bay Municipal Utility District (EBMUD), "Irrigation Controllers Timer for the Homeowner", United States Environmental Protection Agency (EPA), http://www.epa.gov/owm/water-efficiency/irrigation_booklet.pdf.*

(Continued)

*Primary Examiner*—Charles R Kasenge
(74) *Attorney, Agent, or Firm*—Michael H. Jester

(57) ABSTRACT

An evapotranspiration (ET) unit includes a processor and a memory for storing a historical set of components of ET data. The processor can communicate with one or more environmental sensors each capable of generating a signal representing an actual value to be substituted for a corresponding one of the components of the historical set. Preprogrammed algorithms enable the processor to calculate changes to a set of watering schedules of a predetermined watering program of an irrigation controller based on any substituted actual value and the remaining historical set of components. The ET unit 10 communicates the changes to the irrigation controller. Optionally the ET unit 10 can receive and store a downloaded actual set of components of ET data and preprogrammed default algorithms calculate the changes to the watering schedules solely based on the downloaded actual set of components of ET data, thus alleviating any need for utilization of the historical set of components of ET data and any actual values generated by the environmental sensors.

30 Claims, 3 Drawing Sheets

U.S. PATENT DOCUMENTS

| | | | | |
|---|---|---|---|---|
| 2004/0206395 | A1* | 10/2004 | Addink et al. | 137/80 |
| 2005/0211791 | A1* | 9/2005 | Clark et al. | 239/68 |
| 2005/0211792 | A1* | 9/2005 | Clark et al. | 239/68 |
| 2005/0211793 | A1* | 9/2005 | Clark et al. | 239/68 |
| 2005/0211794 | A1* | 9/2005 | Clark et al. | 239/69 |
| 2005/0216127 | A1* | 9/2005 | Clark et al. | 700/284 |
| 2005/0216128 | A1* | 9/2005 | Clark et al. | 700/284 |
| 2005/0216129 | A1* | 9/2005 | Clark et al. | 700/284 |
| 2005/0216130 | A1* | 9/2005 | Clark et al. | 700/284 |

OTHER PUBLICATIONS

"Toro Partners with HydroPoint Date Systems to Develop Weather-Based Irrigation Controllers" of Athletic Turf News from Internet—E-mail address: http://athleticturf.net/athleticturf/article—article dated Jan. 16, 2004. (© 2002-2004 Advanstar Communications) 2 pages.

"Smart Irrigation, Made Simple" of WEATHERTRAK © from Internet—E-mail address: http://www.hydropoint.com/—(© 2004 Hydropoint, Inc.) 1 page.

"Residential Landscape Irrigation Study Using Aqua ET Controllers" for Aqua Conserve, Denver Water, Denver, CO & City of Sonoma, CA & Valley of the Moon Water District, CA, (Jun. 2002.) 5 pages.

Aqua Conserve Products from Internet—E-mail address: http://www.aquaconserve.com/products.php—(© 2002, Aqua Conservation Systems) 5 pages.

"SRR Remote Wiring and Installation" of HUNTER © The Irrigation Innovators from Internet—E-mail address: http://www.hunterindustries.com/resources/technical_bulletins/srr_remote.html—(© 2004 Hunter Industries Incorporated) 1 page.

"Crop Evapotranspiration—Guidelines for Computing Crop Water Requirements—FAO Irrigation and Drainage Paper 56" Attachment for link to Internet—E-mail address: http://hydrotechnic.150m.com/crop_water.html (no date) 60 pages.

* cited by examiner

EVAPOTRANSPIRATION UNIT CONNECTABLE TO AN IRRIGATION CONTROLLER

FIELD OF THE INVENTION

The present invention relates to electronic controllers that control valves that supply water to sprinklers that irrigate turf and landscaping.

BACKGROUND OF THE INVENTION

In many parts of the world due to inadequate rainfall it is necessary at certain times during the year to artificially water turf and landscaping. An ideal irrigation system for turf and landscaping should utilize a minimum number of valves, supply lines and sprinklers. Preferably the valves should be turned ON and OFF by an inexpensive, yet reliable electronic irrigation controller that is easy to program and can carry out a wide variety of watering schedules. The goal is to uniformly distribute the optimum amount of water over a given area. The type, placement and flow rates for each of the sprinklers are pre-selected when an irrigation system is designed and/or installed. The optimum flow rate provided by each sprinkler should preferably fall within plus or minus one-quarter gallon-per minute (GPM). The amount of water supplied by each sprinkler is largely determined by the size and configuration of its nozzle orifice(s), although variations result from fluctuations in water pressure that cannot be fully negated with regulators.

Residential and commercial irrigation systems typically include one or more solenoid operated valves that are turned ON and OFF by the electronic irrigation controller. The valves admit water to various subterranean branch lines usually made of PVC pipe that typically have several sprinklers connected to risers coupled to the branch lines at spaced intervals. Each combination of a solenoid valve and its associated sprinklers is referred to in the irrigation industry as a station or zone. A modern electronic irrigation controller typically includes a microprocessor that executes one or more watering programs. The watering programs can, typically, be pre-programmed by the user via push button and/or rotary controls. The watering programs contain one or more watering schedules which consist of run and cycle times for each station. The controller usually has an LCD or other display to facilitate programming by the user. Often the controller will revert to a default watering program in the case of a power failure. The microprocessor controls the solenoid valves via suitable drivers and switching devices. The valves are opened and closed by the microprocessor in accordance with the pre-programmed run and cycle times for each of the stations.

Homeowners, conservationists and water purveyors are increasingly interested in minimizing the amount of water used for irrigation, especially in areas like the Southwest where water is in short supply. Some municipalities have enacted restrictions on residential and commercial watering. While such restrictions do save water, they are often arbitrary and do not take into account the watering needs of different types of vegetation in different geographic locations. Techniques have been developed for tailoring watering schedules in an electronic irrigation controller to accommodate different kinds of plants and atmospheric conditions based on evapotranspiration (ET) rate. This is a number that represents the amount of water lost by a plant via evaporation and also the amount of water lost by the plant through transpiration, i.e. loss of water through its leaves. See for example U.S. Pat. No. 5,097,861 granted Mar. 24, 1992 to Hopkins et al. and assigned to Hunter Industries, Inc. of San Marcos, Calif., which discloses a controller that utilizes stored historic ET data for each zip code, along with other stored data, to calculate watering schedules.

The primary environmental factors needed to calculate ET are temperature, amount of solar radiation, relative humidity and wind speed. Rainfall is not included because it is only a source of water and has little effect on how quickly plants lose water. However, an irrigation controller should take into account the effective rainfall, via rain interrupt sensor or otherwise, in determining the optimum watering schedule. Effective rainfall depends upon such things as soil type, slope and root depth as these determine the amount of water that actually makes it to the plant roots as opposed to the amount of runoff. Atmospheric conditions affect both evaporation and transpiration. Plant type also affects transpiration.

U.S. Pat. No. 6,298,285 of Addink et al. granted Oct. 2, 2001 and assigned to Aqua Conservation Systems, Inc. discloses an irrigation controller that is capable of making daily adjustment of irrigation duration based upon historical, environmental and/or received information. The controller can automatically skip days and make changes to account for daily and seasonal environmental changes.

Published U.S. Patent Application US 2003/0109964 A1 of Addink et al. discloses an irrigation controller that uses a regression model to estimate ET and uses it to affect the irrigation schedule executed by the controller. The regression model is based on a comparison of historical ET values against corresponding historical environmental values such as temperature, solar radiation, wind speed, humidity, barometric pressure, cloud cover and soil moisture.

Published U.S. Patent Application US 2004/0011880 A1 of Addink et al. discloses an irrigation scheduler that attaches to the output lines of an irrigation controller and interrupts the output signals to the valves to effectuate an improved watering schedule based on ET or weather data.

Conventional techniques for using ET data in an irrigation controller often require a fee to be paid for receiving and utilizing the ET information. Irrigation controllers capable of calculating watering schedules based on ET are typically complicated to use and expensive to buy. Those schedulers which "piggy back" onto an existing controller have limitations because they can only reduce the existing watering schedules in the base controller.

SUMMARY OF THE INVENTION

In accordance with the present invention an evapotranspiration (ET) unit includes a processor and a memory for storing a historical set of components of ET data. The processor can communicate with one or more environmental sensors each capable of generating a signal representing an actual value to be substituted for a corresponding one of the components of the historical set. Preprogrammed algorithms enable the processor to calculate changes to a set of watering schedules of a predetermined watering program of an irrigation controller based on any substituted actual value and the remaining historical set of components. The ET unit communicates the changes to the irrigation controller. Optionally the ET unit can receive and store a downloaded actual set of components of ET data and preprogrammed default algorithms calculate the changes to the watering schedules solely based on the downloaded actual set of components of ET data, thus alleviating any need for utilization of the historical set of components of ET data and any actual values generated by environmental sensors.

The present invention also provides a method of optimizing the watering schedules of an existing irrigation controller. The first step of the method involves storing a historical set of components of ET data. The next step involves utilizing one or more environmental sensors for generating one or more signals representing actual values to be substituted for corresponding components of the historical set. The next step involves calculating changes to a set of watering schedules of a predetermined watering program of an irrigation controller based on any substituted actual values and the remaining historical set of components. The final step of the method involves communicating the changes to the irrigation controller. Optionally, our method involves the alternate steps of receiving and storing a downloaded actual set of components of ET data and calculating the changes to the set of watering schedules of the predetermined watering program based on the downloaded actual set of components of the ET data.

DETAILED DESCRIPTION

Figure 1:
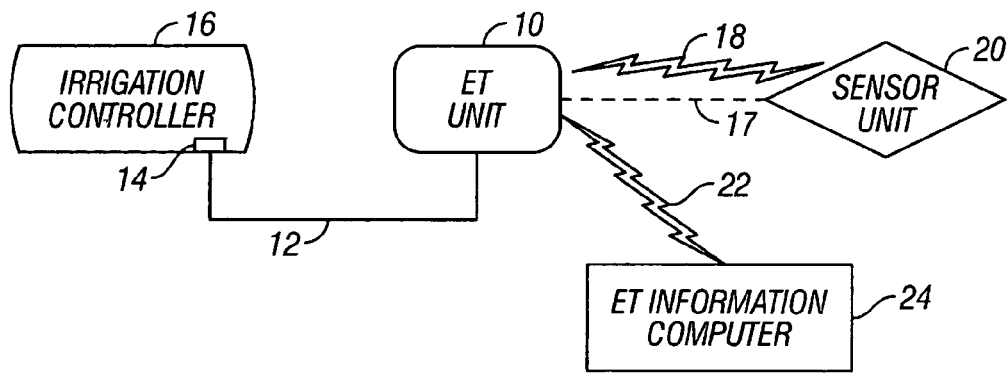
FIG. 1 is a block diagram of an evapotranspiration unit connected to an irrigation controller, a remote sensor unit and the computer of an ET information service provider in accordance with an embodiment of the present invention.

Referring to FIG. 1, in accordance with an embodiment of the present invention an evapotranspiration (ET) unit 10 is connected via wiring harness 12 to an input port 14 of an irrigation controller 16 for affecting its watering schedules based on current and/or historical ET, and optionally, user inputted information such as plant types, soil conditions, growth stage and sprinkler precipitation rate. The ET unit 10 is in turn connected via hard wired connection 17 or wireless link 18 to a remote sensor unit 20, and via wireless link 22 to the computer 24 of an ET information service provider.

The input port 14 of the controller 16 can accept a portable data shuttle (not illustrated) for uploading a watering program created on a personal computer or for directly uploading changes to an existing watering program stored in the memory of the controller 16. Alternatively, a connector on the wiring harness 12 can be mated with a connector that forms the input port 14 so that the ET unit 10 can make changes to the existing watering schedules to ensure that the minimum amount of water is used to keep the turf and other landscaping watered by the controller 16 healthy and "green." The irrigation controller 16 is preferably a microprocessor based system of the type disclosed in U.S. Pat. No. 6,088,621 granted Jul. 11, 2000 to Peter J. Woytowitz et al., the entire disclosure of which is hereby incorporated by reference. The aforementioned patent is assigned to Hunter Industries, Inc., the assignee of the subject application. Irrigation controllers embodying the invention of the aforementioned patent and including the SMARTPORT (Registered Trademark) feature are commercially available from Hunter Industries, Inc. and are sold in the United States under the model designations SRC, Pro-C and ICC.

The remote sensor unit 20 can include one or more environmental sensors such as a temperature sensor, humidity sensor, wind sensor, and/or rain sensor. They can be packaged in one common housing for incremental cost savings or mounted as separate individual components. Suitable environmental sensors are commercially available from various manufacturers and need not be described further herein.

Figure 2:
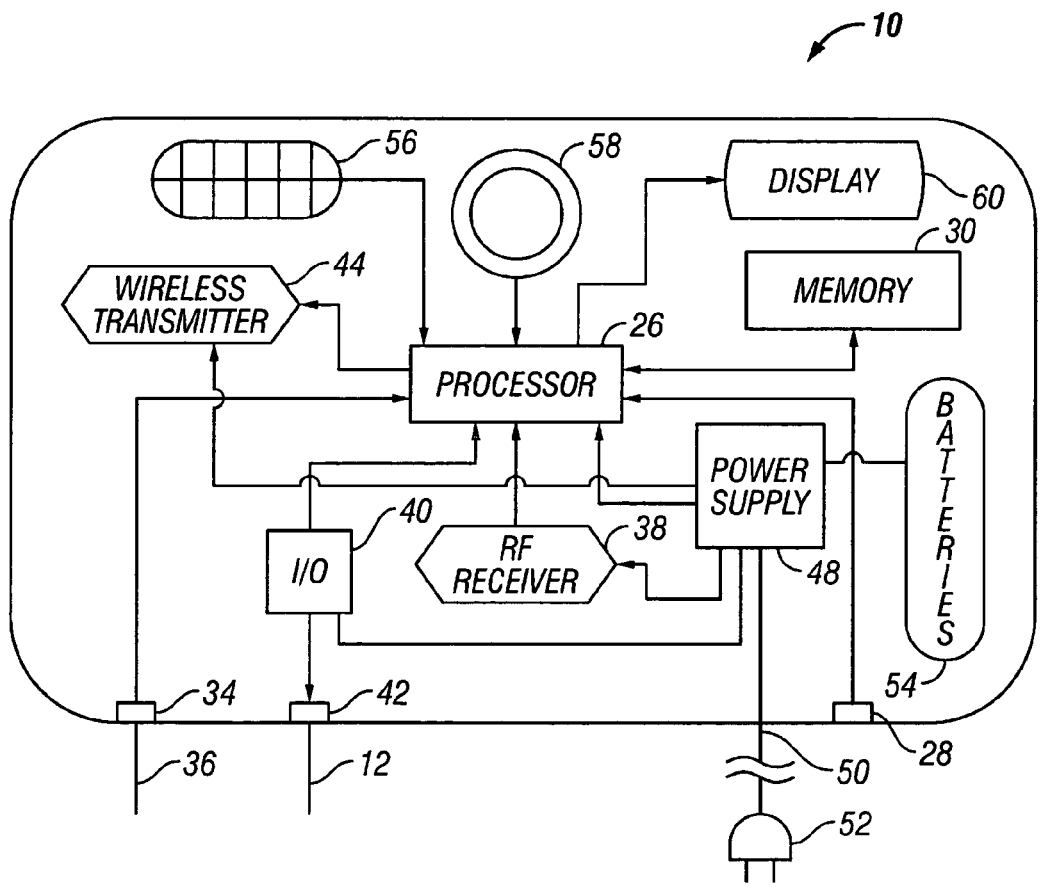
FIG. 2 is a block diagram illustrating further details of the evapotranspiration unit illustrated in FIG. 1.

Referring to FIG. 2, the ET unit 10 includes a processor 26. The processor 26 may be a microprocessor with external RAM and ROM or EEPROM (not separately illustrated) or a single integrated circuit microcomputer having a CPU and on-chip volatile and non-volatile memory. An input port 28 is connected to the processor 26 for receiving a historical set of components of ET data via removable media, data shuttle or PC (not illustrated) which data can be stored in a non-volatile memory 30. A port 34 and hard wires 36 connect the processor 26 to the remote sensor unit 20. The remote sensor unit 20 includes one or more conventional environmental sensors that are capable of generating a signal representing an actual value to be substituted for a corresponding one of the components of the historical set. An optional RF receiver 38 connected to the processor 26 receives signals indicative of the readings of the environmental sensors via an optional RF transmitter (not illustrated in FIG. 1) inside the remote sensor unit 20. Algorithms are preprogrammed into the non-volatile memory of the processor 26, or the memory 30, for enabling the processor 26 to calculate changes to a set of watering schedules of the predetermined watering program of the irrigation controller 16 based on any substituted actual value and the remaining historical set of components. An I/O device 40 is connected to the processor 26 for communicating the changes to the irrigation controller 16 via port 42 and the wiring harness 12. The I/O device 40 includes means for interfacing with the processor of the irrigation controller 16 via synchronous, asynchronous or parallel data bus. Optionally the processor 26 can communicate with the irrigation controller via wireless transmitter 44.

The RF receiver 38 (FIG. 2) can also receive an actual set of components of ET data from the computer 24 (FIG. 1) of the ET information service provider. For a monthly fee, this data is sent daily to the ET unit 10 using well known pager technology, such as offered under the Motorola trademark and service mark. Alternatively the ET unit 10 could download the actual set of components of ET data via the Internet, network connection, removable storage media or any other well known method of data communication. Default algorithms are preprogrammed into suitable flash memory for enabling the processor 26 to calculate changes to the set of watering schedules of the predetermined watering program based on the downloaded actual set of components of the ET data. A power supply 48 may be connected to an AC source via electric cord 50 and plug 52. Batteries 54 supply standby power to ensure that any programming or data in volatile memory is not lost during a power outage. The ET unit 10 can also run off of 24 VAC supplied by the irrigation controller 16.

A keypad 56 and a rotary switch 58 are connected to the processor 26 for manually inputting further information selected from the group consisting of plant type, soil conditions, growth stages and sprinkler precipitation rates, which inputted information is displayed to the user on display 60. Since the reference ET data does not cover all environmental or plant specific factors, the ET unit 10 can beneficially utilize such information. The inputted information can include any of the following, or any permutations and combinations thereof:

Plant Types (Based Loosely on Height and Root Depth)
   1) Ground level: grass, ground cover, small plants, and other shallow root depth plants;

2) Medium level: shrubs, tropical or immature trees, ornamental plants, and other medium root depth plants; and
3) Large level: tall trees, and other plants with deep root depths.

Soil Conditions
1) Coarse: rock, gravel, sand, high water permeability materials, and low water retention materials;
2) Medium: mixed soil, sandy loam, high organic content materials, medium water permeability materials, medium water retention materials;
3) Fine: claim soils, dense soil mixture, low water permeability materials, high water retention materials;
4) Slope: the slope or grade of the soil greatly affects the run-off rates and watering cycles;
5) Soil salinity: an optional factor that may affect the watering amount if the soil salinity is high;
6) Ground cover or surface mulch levels: another optional factor that can reduce watering amounts; and
7) Subsurface water table effects: high water tables, capillary rise and deep percolation may affect the ET number, although in most regions it has minimal effect.

Growth Stages
1) Initial: negligible to shallow to shallow root depth, ground cover between zero and ten percent evaporation predominates;
2) Crop development: ten percent to full ground cover, transpiration takes over as ground cover increases and root depth deepens;
3) Mid-season: full ground cover to start of maturity, root depth and ground coverage are at their peaks; and
4) Late-season: from the start of maturity to harvest for crops, leaf drop or plant senescence.

Precipitation Rate of Sprinklers
1) Amount of water applied (preferably in inches per hour) by the sprinkler; and
2) Application amounts are converted to run times for the watering schedule changes.

To aid in the flexibility of the use of the ET unit 10, the user may also want to input externally calculated ET numbers or input other adjustments to the ET data to reflect acceptable plant stress levels. Thus the algorithms preferably allow for user override existing ET data.

The algorithms preprogrammed into the flash memory enable the processor 26 to calculate the changes to the set of watering schedules based on the inputted information in addition to any substituted actual value and the remaining historical set of components. Where the processor defaults to calculating changes to the set of watering schedules based on the downloaded actual set of components of ET data, the default algorithms enable the processor 26 to calculate the changes based on the inputted information in addition to the downloaded actual set of components of the ET data.

Figure 3:
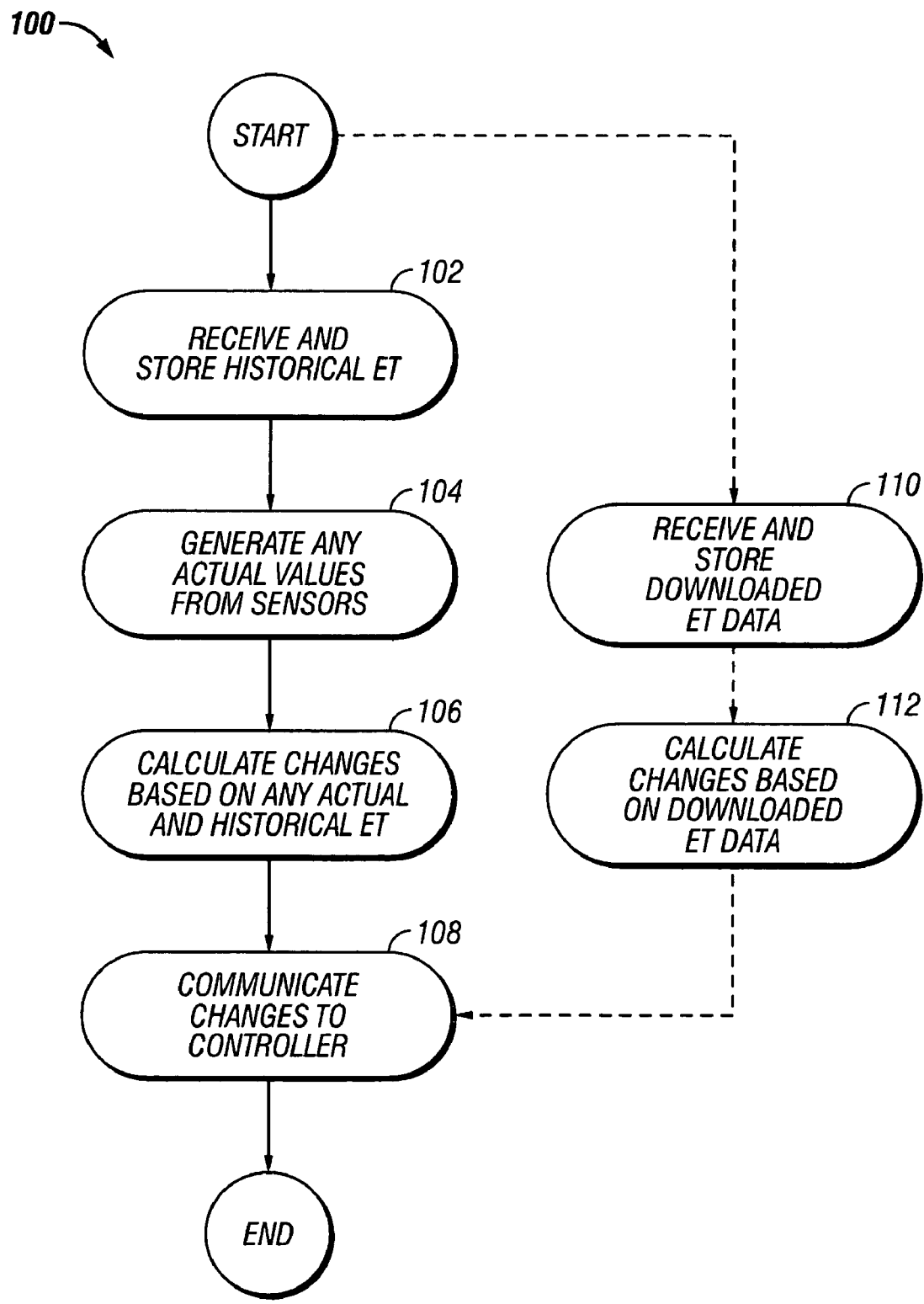
FIG. 3 is a flow diagram illustrating an embodiment of the method of the present invention.

Referring to FIG. 3, the present invention also provides a method 100 of optimizing the watering schedules of an existing irrigation controller. The first step 102 of the method involves receiving and storing a historical set of components of ET data. The next step 104 involves utilizing one or more environmental sensors for generating one or more signals representing actual values to be substituted for corresponding components of the historical set. The next step 106 involves calculating changes to a set of watering schedules of a predetermined watering program of an irrigation controller based on any substituted actual values and the remaining historical set of components. The final step 108 of the method involves communicating the changes to the irrigation controller. Optionally, our method involves the alternate steps 110 and 112, respectively, of receiving and storing a downloaded actual set of components of ET data, and then calculating the changes to the set of watering schedules of the predetermined watering program based on the downloaded actual set of components of the ET data.

Figure 4:
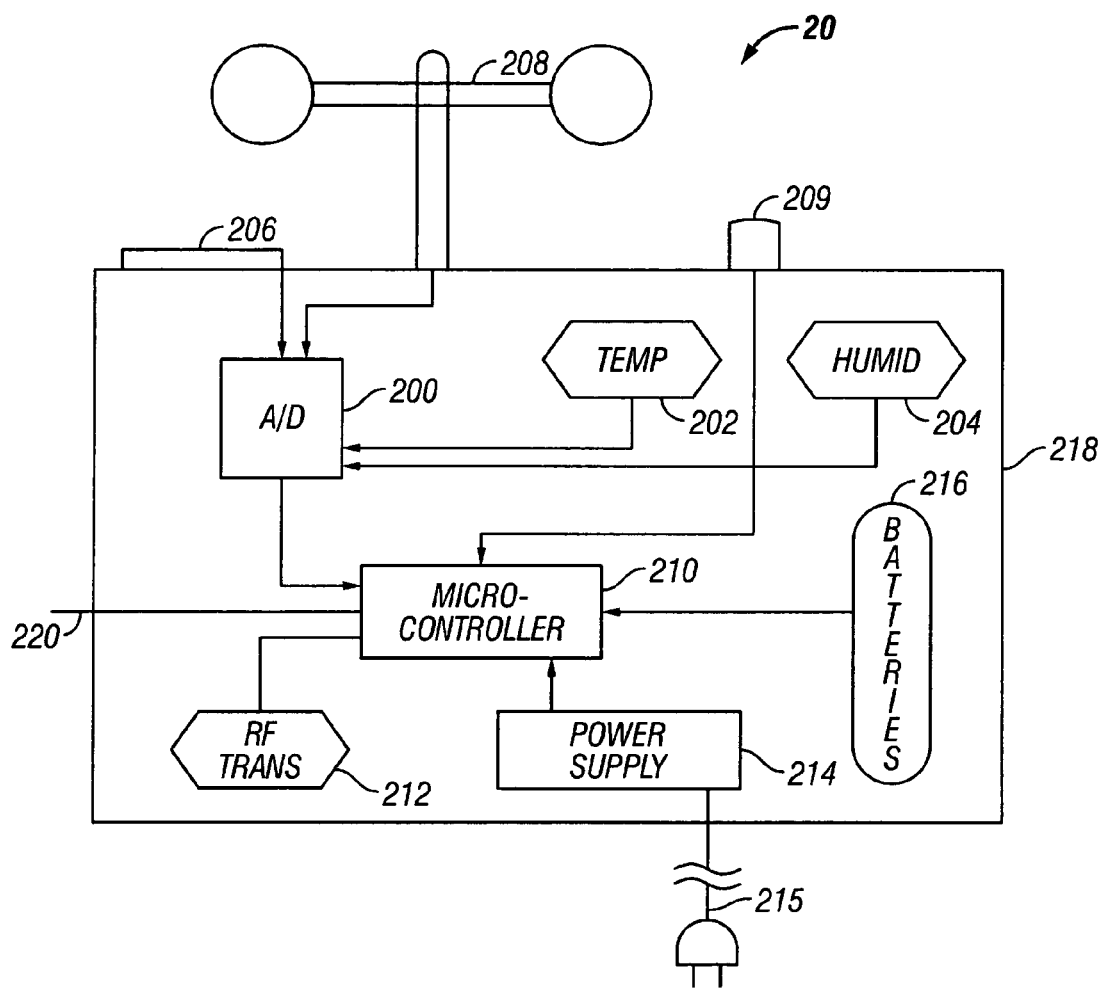
FIG. 4 is a block diagram of an embodiment of a remote sensor unit that may be used with the evapotranspiration unit of FIG. 2.

FIG. 4 is a block diagram of an embodiment of the remote sensor unit 20 that may be used with the evapotranspiration unit of FIG. 2. An analog-to-digital (A/D) device 200 receives analog signals from a temperature sensor 202, a humidity sensor 204, a solar radiation sensor 206, and a wind speed sensor 208 and converts them into digital form. Digital signals from a rain sensor 209 are fed directly to a processor in the form of a micro-controller 210. The digital signals from the A/D device 200 and the rain sensor 209 are processed by the microcontroller 210 and encoded for sequential transmission to the ET unit 10 via RF transmitter 212 where they are received by the RF receiver 38. The RF signals encoded with the information representing the actual values of the temperature, humidity, etc. could also be directly received and processed by an irrigation controller 16 equipped with an RF receiver. The remote sensor unit 20 includes a power supply 214 connectable to an AC source via cord 215 and includes batteries 216 for standby power. The sensor unit 20 could also be powered via solar and/or wind sources. The temperature sensor 202 and the humidity sensor 204 are preferably mounted within a plastic housing 218 that also encloses a PC board assembly (not illustrated) that connects the various electronic components of the remote sensor unit 20. The solar radiation sensor 206 and the wind speed sensor are preferably mounted to the exterior surface of the same plastic housing 218. Alternatively, the environmental sensors 202, 204, 206 and 208 may be individually mounted remote from the housing 218 and hard wired to the PC board assembly. Typically the ET unit 10 will be mounted adjacent to the existing irrigation controller 14, such as on a garage wall. Usually the environmental sensors are mounted outside the garage, some distance therefrom. The remote sensor unit 20 can be mounted a considerable distance from the ET unit 10, and can transmit actual values to be used in calculating the watering schedule changes via the wireless link 18 (FIG. 1), thereby avoiding the signal losses otherwise encountered when analog signals are sent to the ET unit 10 long distance over optional hard wires 220.

Our invention takes a unique approach to the use of ET data to optimize the watering schedules of an existing irrigation controller. This is done by providing an ET unit 10 separate from the irrigation controller but connectable thereto. The ET unit 10 can receive and store a historical set of components of ET data such as the temperature, humidity, solar radiation, and wind speed for a particular location for each day of the year. The ET unit 10 can also receive inputs from various environmental sensors 202, 204, 206 and 208 that provide an actual value, e.g. temperature, to be substituted for the corresponding component of the historical set for that day. If no sensors are connected to the ET unit 10, the processor 26 in the ET unit 10 calculates changes to the watering schedules that provide the optimum amount of water to the landscaping based solely upon the historical set of stored ET data. These changes are communicated to the processor of the irrigation controller 16 to affect the desired changes in the watering schedules. If any environmental sensors are connected to the ET unit 10, the actual values of the sensed conditions, such as humidity, are used in place of the corresponding stored historical component for that day in calculating the watering schedule changes. Moreover, the ET unit 10 can operate in a default mode in which changes to watering schedules are calculated based solely on a downloaded actual set of components of ET data transmitted by a service provider from its computer 24 on a daily or other time interval basis.

Thus a person with an installed irrigation controller 16 can purchase the basic ET unit 10 of our invention, with stored historical ET data for specific geographic locations, connect it to the irrigation controller 16, and immediately achieve optimized watering schedules to a degree. Even better optimization can be obtained by purchasing and connecting one or more environmental sensors 202, 204, 206 and 208, at additional cost. If enough environmental sensors are attached, there will be no need to use any of the stored historical ET data in calculating changes to watering schedules and these changes will be further optimized. For less cost sensitive installations, the property owner can sign up with an ET data service provider, in which case no environmental sensors need be attached to the ET unit 10. The watering schedule changes will then be calculated solely on the basis of an actual set of components of ET data downloaded on a daily basis. The stored historical ET data is not used at all in this instance.

The ET unit 10 preferably calculates the changes to the watering schedule in the same manner, regardless of whether the ET data is all historical, all actual, or partly historical and partly actual, and regardless of the source. The calculations can be performed with stored algorithms that utilize a set of equations based on the Penman-Monteith, Penman, modified Penman, Hargreaves or FAO methods to estimate the reference ET in the event that only limited sensor information is available to the ET unit 10.

An advantage of our ET unit 10 is that it can be used with an existing irrigation controller 16 without complicating or compromising that irrigation controller. The user can choose his/her own point in the cost/accuracy trade off associated with automated irrigation systems. There may be geographic regions where there is little departure from historic ET data for certain factors. In these areas there would be no need to purchase the environmental sensors or to purchase daily updated actual ET data from a service provider. The operation of the ET unit 10 can be tailored to the user's comfort level. For example, many irrigation controllers have a water budget feature which is typically a setting that reduces all run times by a given percentage, such as ten percent. The ET unit 10 can increase all run times by a predetermined percentage in order to accommodate a hotter than normal week. The ET unit 10 can be programmed to affect the operation of the irrigation controller 16 only during certain seasons. The ET unit 10 can be programmed so that it will not affect the start times and days of the week, but will still optimize the cycle times. On the other end of the spectrum, the ET unit 10 may assume full control of all watering schedules, rather than merely scale run times. It could then control the amount of water per week, break the application into cycles if needed, and vary the frequency of applications.

The ET unit 10 differs from prior art irrigation schedulers that attach to the output lines of an existing irrigation controller leading to the solenoid actuated valves. Such schedulers can only reduce the existing watering schedules. Our ET unit 10 communicates with the processor of an existing irrigation controller and effectively re-programs its existing watering program to optimize its watering schedules in accordance with ET data so as to keep soil and plants healthy and green with the minimum amount of water.

While we have described an embodiment of our ET unit 10, and an embodiment of our remote sensor unit, it will be apparent to those skilled in the art that our invention can be modified in both arrangement and detail. For example, the ET unit 10 could be an integral part of the irrigation controller 16. The remote sensor unit 20 could be an integral part of the ET unit 10, i.e. at least one environmental sensor could be mounted in the same housing that also encloses the processor 26. The ET unit 10 could be preprogrammed to take full control of the watering schedule of the irrigation controller 10. The ET unit 10 could calculate a schedule based on information programmed by the user, and then it could either: 1) load this schedule into the irrigation controller 16; or 2) use the port 14 to manually start stations at the proper time and the proper duration. The second option has another advantage in that it could implement much more complex programs than the irrigation controller 16 itself. Furthermore, it could do this somewhat cost effectively since the triacs and power circuitry, which represent a fair portion of the cost of irrigation controllers, would be in the main controller and not be duplicated in the ET unit 10. Therefore the protection afforded our invention should only be limited in accordance with the scope of the following claims.

We claim:

1. An evapotranspiration (ET) unit, comprising:

a processor;

means connected to the processor for storing a historical set of components of ET data;

first means for providing communication between the processor and one or more environmental sensors each capable of generating a signal representing an actual value to be substituted for a corresponding one of the components of the historical set;

preprogrammed means for enabling the processor to calculate changes to a set of watering schedules including cycles and run times of a predetermined watering program of an irrigation controller based on any substituted actual value and the remaining historical set of components; and second means connected to the processor for communicating the changes to the irrigation controller.

2. The unit of claim 1 and further comprising:

means connected to the processor for receiving and storing a downloaded actual set of components of ET data; and preprogrammed default means for enabling the processor to calculate changes to the set of watering schedules of the predetermined watering program based on the downloaded actual set of components of the ET data.

3. The unit of claim 1 and further comprising means connected to the processor for manually inputting further information selected from the group consisting of plant type, soil conditions, growth stages and sprinkler precipitation rates, and wherein the preprogrammed means enables the processor to calculate the changes to the set of watering schedules based on the inputted information in addition to any substituted actual value and the remaining historical set of components.

4. The unit of claim 2 and further comprising means connected to the processor for manually inputting further information selected from the group consisting of plant type, soil conditions, growth stages and sprinkler precipitation rates, and wherein the preprogrammed default means enables the processor to calculate the changes to the set of watering schedules based on the inputted information in addition to the downloaded actual set of components of the ET data.

5. The unit of claim 2 and further comprising means connected to the processor for receiving a downloaded actual set of components including an RF receiver.

6. The unit of claim 1 wherein the first communicating means includes an RF receiver.

7. The unit of claim 1 wherein the second communicating means includes a wire harness.

8. The unit of claim 1 wherein the second communicating means includes an RF transmitter.

9. The unit of claim 1 and further comprising at least one environmental sensor mounted in a housing that also encloses the processor.

10. The unit of claim 1 wherein the second communicating means includes means for interfacing with a second processor in the irrigation controller.

11. A method of optimizing the watering schedules of an existing irrigation controller, comprising the steps of:
storing a historical set of components of ET data;
utilizing one or more environmental sensors for generating signals representing actual values to be substituted for corresponding ones of the components of the historical set;
calculating changes to a set of watering schedules including cycles and run times of a predetermined watering program of an irrigation controller based on any substituted actual value and the remaining historical set of components; and
communicating the changes to the irrigation controller.

12. The method of claim 11 and further comprising the steps of:
receiving and storing a downloaded actual set of components of ET data; and
calculating the changes to the set of watering schedules of the predetermined watering program based on the downloaded actual set of components of the ET data.

13. The method of claim 11 and further comprising the step of manually inputting further information selected from the group consisting of plant type, soil conditions, growth stages and sprinkler precipitation rates, and wherein the changes to the set of watering schedules are calculated based on the inputted information in addition to any substituted actual value and the remaining historical set of components.

14. The method of claim 12 and further comprising the step of manually inputting further information selected from the group consisting of plant type, soil conditions, growth stages and sprinkler precipitation rates, and wherein the changes to the set of watering schedules are calculated based on the inputted information in addition to the downloaded actual set of components of the ET data.

15. The method of claim 12 wherein the downloaded actual set of components are received via RF transmission.

16. The method of claim 11 wherein the signals from the environmental sensors received via RF transmission.

17. The method of claim 11 wherein the changes are communicated to the irrigation controller via hard wired connection.

18. The method of claim 11 wherein the changes are communicated to a processor of the irrigation controller.

19. The method of claim 11 wherein the signals from the environmental sensors received via RF transmission and the changes are communicated to the irrigation controller via hard wired connection.

20. An evapotranspiration (ET) unit, comprising:
a processor;
means connected to the processor for storing a historical set of components of ET data;
means connected to the processor for receiving and storing a downloaded actual set of components of ET data;
means for connecting the processor to one or more environmental sensors each capable of generating a signal representing an actual value to be substituted for a corresponding one of the components of the historical set;
means connected to the processor for manually inputting further information selected from the group consisting of plant type, soil conditions, growth stages and sprinkler precipitation rates;
preprogrammed means for enabling the processor to calculate changes to a set of watering schedules including cycles and run times of a predetermined watering program of an irrigation controller based on any substituted actual value, the remaining historical set of components and the inputted information;
preprogrammed default means for alternately enabling the processor to calculate changes to the set of watering schedules of the predetermined watering program based on the downloaded actual set of components of the ET data and the inputted information; and
means connected to the processor for communicating the changes to the irrigation controller.

21. An evapotranspiration (ET) unit, comprising:
a processor;
a memory connected to the processor that stores a historical set of components of ET data;
a first communications link between the processor and one or more environmental sensors each capable of generating a signal representing an actual value to be substituted for a corresponding one of the components of the historical set;
programming that enables the processor to calculate changes to a set of watering schedules including cycles and run times of a predetermined watering program based on any substituted actual value and the remaining historical set of components; and
a second communications link connected to the processor that can send the changes to the irrigation controller.

22. The unit of claim 21 and further comprising:
additional memory capacity connected to the processor that receives and stores a downloaded actual set of components of ET data; and
a preprogrammed default that allows the processor to calculate changes to the set of watering schedules of the predetermined watering program based on the downloaded actual set of components of the ET data.

23. The unit of claim 21 and further comprising at least one control connected to the processor and configured for manually inputting further information selected from the group consisting of plant type, soil conditions, growth stages and sprinkler precipitation rates, and wherein the programming enables the processor to calculate the changes to the set of watering schedules based on the inputted information in addition to any substituted actual value and the remaining historical set of components.

24. The unit of claim 22 and further comprising at least one control connected to the processor for manually inputting further information selected from the group consisting of plant type, soil conditions, growth stages and sprinkler precipitation rates, and wherein the preprogrammed default enables the processor to calculate the changes to the set of watering schedules based on the inputted information in addition to the downloaded actual set of components of the ET data.

25. The unit of claim 22 and further comprising an RF receiver connected to the processor for receiving a downloaded actual set of components.

26. The unit of claim 21 wherein the first communications link includes an RF receiver.

27. The unit of claim 21 wherein the second communications link includes a wire harness.

28. The unit of claim 21 wherein the second communications link includes an RF transmitter.

29. The unit of claim 21 and further comprising at least one environmental sensor mounted in a housing that also encloses the processor.

30. The unit of claim 21 wherein the second communications link includes an interface with a second processor in the irrigation controller.

* * * * *